United States Patent
Cross

[19]

[11] Patent Number: 5,947,055
[45] Date of Patent: Sep. 7, 1999

[54] MOVABLE LIVESTOCK FEEDER FOR BALED HAY WITH SOLID TROUGH

[76] Inventor: James B. Cross, 39246 Lime Kiln Rd., Leesburg, Va. 20175

[21] Appl. No.: 09/025,811

[22] Filed: Feb. 19, 1998

[51] Int. Cl.[6] .................................................... A01K 1/10
[52] U.S. Cl. .............................. 119/58; 119/60; 119/61; 119/63
[58] Field of Search .................................. 119/63, 61, 60, 119/51.12, 52.1, 52.4, 57, 58, 51.01, 59

[56] References Cited

U.S. PATENT DOCUMENTS

| | | | |
|---|---|---|---|
| 53,634 | 4/1866 | Lamb | 119/58 |
| 138,351 | 4/1873 | Spencer | 119/58 |
| 275,239 | 4/1883 | Marsh | 119/60 |
| 310,261 | 1/1885 | Downing | 119/58 |
| 375,824 | 1/1888 | Light | 119/60 |
| 387,892 | 8/1888 | Light | 119/60 |
| 697,239 | 4/1902 | Davis | 119/58 |
| 708,297 | 9/1902 | Baughman | 119/58 |
| 872,032 | 11/1907 | Tolle | 119/58 |
| 3,004,518 | 10/1961 | Struckhoff | 119/58 |
| 3,834,353 | 9/1974 | Groezinger | 119/60 |
| 3,906,901 | 9/1975 | Cox | 119/58 |
| 4,020,794 | 5/1977 | Nethery | 119/58 |
| 4,148,278 | 4/1979 | Anderson | 119/60 |
| 4,258,663 | 3/1981 | Schoessow | 119/58 |
| 4,364,333 | 12/1982 | Touchette | 119/52.4 |
| 4,419,963 | 12/1983 | Willibrordus | 119/51.01 |
| 4,706,609 | 11/1987 | Delichte | 119/60 |
| 4,930,449 | 6/1990 | Harton | 119/60 |
| 5,158,040 | 10/1992 | Martin | 119/58 |
| 5,178,096 | 1/1993 | Lock | 119/58 |
| 5,188,060 | 2/1993 | Johnson | 119/58 |
| 5,237,962 | 8/1993 | Garman | 119/58 |
| 5,303,673 | 4/1994 | Weelink | 119/60 |
| 5,375,559 | 12/1994 | Baadsgaard | 119/58 |

FOREIGN PATENT DOCUMENTS

| | | | |
|---|---|---|---|
| 1243910 | 11/1988 | Canada | 119/58 |
| 2450556 | 10/1980 | France | 119/58 |
| 2489222 | 3/1982 | France | 119/58 |

*Primary Examiner*—Michael J. Carone
*Assistant Examiner*—Judith A. Nelson
*Attorney, Agent, or Firm*—Fisher, Christen & Sabol

[57] ABSTRACT

A livestock feeder has a trough having a downwardly sloping section of a feeding surface ending in a lowermost portion disposed below a suspended horizontal bottom hay bale stop bar. The horizontal bottom hay bale stop bar is positioned above and not in contact with the feeding surface of the trough. The animals may feed directly from the hay bale by reaching below the bottom stop bar or may feed through the inner frame, by reaching above the stop bar. The outer cage and inner frame define a livestock feeding region which functions such that when the livestock are feeding, loosened and dropped seed and hay flow down the downwardly sloping feeding surface, towards the front wall of the trough and into the lowermost portion where they are retained until they are consumed by the livestock without wastage. The feeder has access for feeding by the livestock limited to the front wall side of the feeder, resulting in easy, safe accessibility by vehicles used for loading the feeder or transporting the feeder. The feeder trough may be cast from concrete or cement to provide a highly durable, weather-resistant structure which is portable but not easily damaged by large livestock such as cattle.

20 Claims, 3 Drawing Sheets

MOVABLE LIVESTOCK FEEDER FOR BALED HAY WITH SOLID TROUGH

FIELD OF THE INVENTION

This invention relates to movable livestock feeders for use in dispensing bales of hay to a group of animals, particularly cattle.

BACKGROUND OF THE INVENTION

The feeding of livestock presents several challenges to the farmer or rancher undertaking the task. Feeding is a costly and time-consuming operation. The economics of, for example, the beef cattle or dairy industry could be greatly improved if the manpower required in performing the feeding task and/or the amount of waste normally associated with feeding could be minimized.

One of the main reasons for the necessity of feeding pre-cut dried fodder or hay to the livestock relates to climactic conditions. While the requirements for feeding pre-cut feed are dependent upon climate, almost all locations in the U.S. require that cattle and other livestock be fed at least part of the year. In northern states, such as Wyoming and Montana, feeding may be required as much as nine months of the year.

One of the simplest feeding methods illustrates some of the inherent difficulties of any livestock feeding process. For example, in the feeding of cattle, merely placing a large hay bale in a pen containing a group of cattle leads to significant amounts of waste which can be as much as one-half of the bale or more. This is because the animals tend to break up the bale in order to pick the best parts from the bale. In so doing the other parts of the bale become trampled into the ground and soiled and are not eaten by the cattle.

Attempts to minimize the manpower required and reduce waste and feed losses in performing the feeding task have employed large, stationary feeding "pavilions". Many such devices have been introduced, such as large feeding troughs, conveyor devices, and the like. However, in general, these devices have had inherent drawbacks. First, many are mechanically complicated, making the use of such devices for the small rancher almost prohibitive in terms of initial purchase as well as maintenance and upkeep. Second, they require that a large number of cattle be fed in a very confined area which leads to sanitary and disease problems. Third, huge quantities of feed are placed in these devices where the cattle, even when restrained by stanchions, have almost unrestrained access to the loose fodder. Thus, just as when a large bale of hay is placed in a pen area, the feeding cattle broadcast or spill or otherwise dump a large fraction of the feed on the ground where it is trampled and soiled. The trampled and soiled feed cannot be eaten and is therefore wasted.

Smaller cattle feeders are available and consist generally of a head-level rack for storing hay, either loose or baled, and a trough in the area below the rack. The purpose of the trough is to catch any hay that falls from the rack. The cattle eat both from the rack and from the trough. These conventional cattle feeders also have rather high rates of hay waste, sometimes as much as 30% or more, through scattering of the hay and the hay being blown away or trampled.

Not only do cattle pick through the hay bale as discussed above, they do not eat neatly, which further contributes to the generation of waste during the feeding process. The main manner in which the waste occurs begins with the cow tearing a tuft of hay out of the bale. The cow then draws the tuft of hay out of the bale, and aside, before starting to eat the mouthful of hay. Inevitably, a proportion of hay falls from the cow's mouth or from the bale of hay during the tearing, drawing out and subsequent eating of the hay by the animal.

It has been proposed by Martin, in U.S. Pat. No. 5,158,040, to construct a feeder that permits the dropped or spilled hay to be collected and re-presented to the cattle in order to reduce the amount of waste. In the animal feeder of U.S. Pat. No. 5,158,040 to Martin, semi-circular slats are arranged to support a cylindrical hay-bale with the axis of the hay-bale disposed horizontally. It is disclosed that the outer-cage comprises a series of vertically disposed outer-cage bars which are spaced apart by such a distance that a typical farm cow can pass its head and neck through and between the bars but cannot pass its shoulders between the bars.

Waste and losses still are possible in devices such as that proposed in U.S. Pat. No. 5,158,040 to Martin, where the outer cage comprises vertical bars. U.S. Pat. No. 4,706,609 to Delichte discloses that the reason for such losses is that the animal tends to place its head into the frame arrangement to grasp the best portion of the feed material and then withdraws its head from the frame by backing up. The animal then eats the material outside the frame, and any material that drops from its mouth lands on the ground and becomes soiled and/or trampled. U.S. Pat. No. 4,706,609 to Delichte discloses a livestock feeder for cylindrical bales where the bale is held in a vertical position. The frame members 21 in the outer frame 11 are inclined relative to a vertical line lying in the cylinder defined by the rails 16 and 17. This arrangement encourages the animal to eat with its head remaining between the inner and the outer frame because a slight twisting movement is required for the head of the animal to exit or enter the space between the inner and outer frames. Both the outer frame and the inner frame are circular in shape.

Movable or portable feeders permit the farmer or rancher to take advantage of natural pasture grass which, although probably being insufficient to support a total herd at certain times of the year, is often of sufficient quantity to substantially supplement the pre-cut feed and thus save costs.

Small, portable feeding devices have been proposed. U. S. Pat. No. 4,258,663 to Schoessow discloses an outer cage having diagonally extending bars or frame members 44 in the outer framework 42. The central portion of the tank bottom located inside the inner rack may be raised and include a pair of oppositely inclined walls which angle downwardly and outwardly towards the outer tank walls so that loose feed slides from the inner rack into the feeding troughs. Schoessow discloses that the cattle feeder can be made a mobile unit by mounting the tank on wheels. The hay is accessible from all four sides of the feeder.

U.S. Pat. No. 4,364,333 to Touchette discloses that portable feeder designs having the wheel axles secured to the floor structure of the feeder may result in excessive tension in the floor structure, causing failure of the floor components or even separation of either axle from the feeder. This problem may be particularly acute when a fully loaded feeder is caused to travel over rough terrain. Touchette proposes a cattle feeder box which can be mounted on an ordinary farm wagon. Other portable hay feeders are disclosed in U.S. Pat. No. 3,906,901 to Cox, U.S. Pat. No. 4,930,449 to Harton, and U.S. Pat. No. 5,188,060 to Johnson, and French patent publication no. 2,450,556 (published Oct. 3, 1980).

Another disadvantage of portable feeders is that livestock, especially large livestock such as cattle, bump and push against the portable feeders during feeding. After a period of time, the portable feeders become bent or deformed due to the contact with the livestock and must be repaired or discarded. This represents a substantial cost and inconvenience. The livestock often must be fed manually in the interim when the feeder is being repaired or replaced, which results in greater feed waste and increased labor costs.

Also, when portable or movable feeders are located in the pasture, the feeder must be easily accessible by vehicles used for loading the feeder with hay bales or transporting the feeder. This vehicle access may be hampered by feeders that are accessible from all sides because the livestock trample the ground around the entire feeder, often making the ground around the feeder unstable due to the formation of mud and loose soil. The unstable ground may not only prevent the feeder from being loaded or moved, it may also present a safety hazard to the operator of a loading vehicle such as fork lift, especially a fully loaded fork lift carrying a hay bale weighing on the order of 500 pounds to 2000 pounds. It is generally undesirable to operate on or have a fork lift travel over unstable ground, especially a loaded fork lift. The fork lift may become stuck, may slide or skid, and also may, under certain circumstances, tipover. Injury to the operator and/or livestock, equipment damage, hay waste, lost time and manpower are all possible consequences of attempting to load a feeder having unstable ground surrounding it. Often the feeder may not be used unless it is loaded by hand in the pasture. This is often the case until the ground stabilizes and the feeder can be approached with a vehicle to load or move it.

It would be desirable to have a livestock feeder design which may be used either for a permanent installation or a movable livestock feeder. Advantageously, such a feeder would have a high feeding efficiency, by preventing the cattle from easily removing hay to a location outside of the trough and also by having a feeder design which results in essentially complete consumption of the feed contained in it.

SUMMARY OF THE INVENTION

The present invention provides a livestock feeder for receiving one or more hay bales, and can be used either in a movable application or a permanent installation. The feeder is highly efficient and provides direct access to the feed by the animals while still controlling that access, by virtue of a suspended hay bale bottom stop bar, which is not in contact with the feeding surface. After moving their head through the outer cage, the animals may feed directly from the hay bale by reaching below the bottom stop bar or may feed through the inner frame, by reaching above the stop bar. The feeding surface of the trough has a downwardly sloping section which continuously urges the feed into a lowermost section of the trough for complete consumption by the livestock. Livestock stop bars define an angled feeding opening through which individual livestock can project their head and neck only and consume the hay in a feeding region, with dropped or scattered feed being contained in the feeder for ultimate consumption with minimal wastage. The suspended bottom hay bale stop bar positioned above and not in contact with the feeding surface of the trough also does not impede loosened seed and hay flowing down the sloping feeding surface and towards the front wall of the trough for access by the livestock without substantial feed waste. Access for feeding is limited to the front wall side of the feeder, which results in improved safety and ease of loading the feeder with motorized farm equipment. The feeder design also simplifies the removal of hay bale restraints by making them easily accessible when the hay bale has been dropped into position.

DETAILED DESCRIPTION OF THE INVENTION

Figure 1:
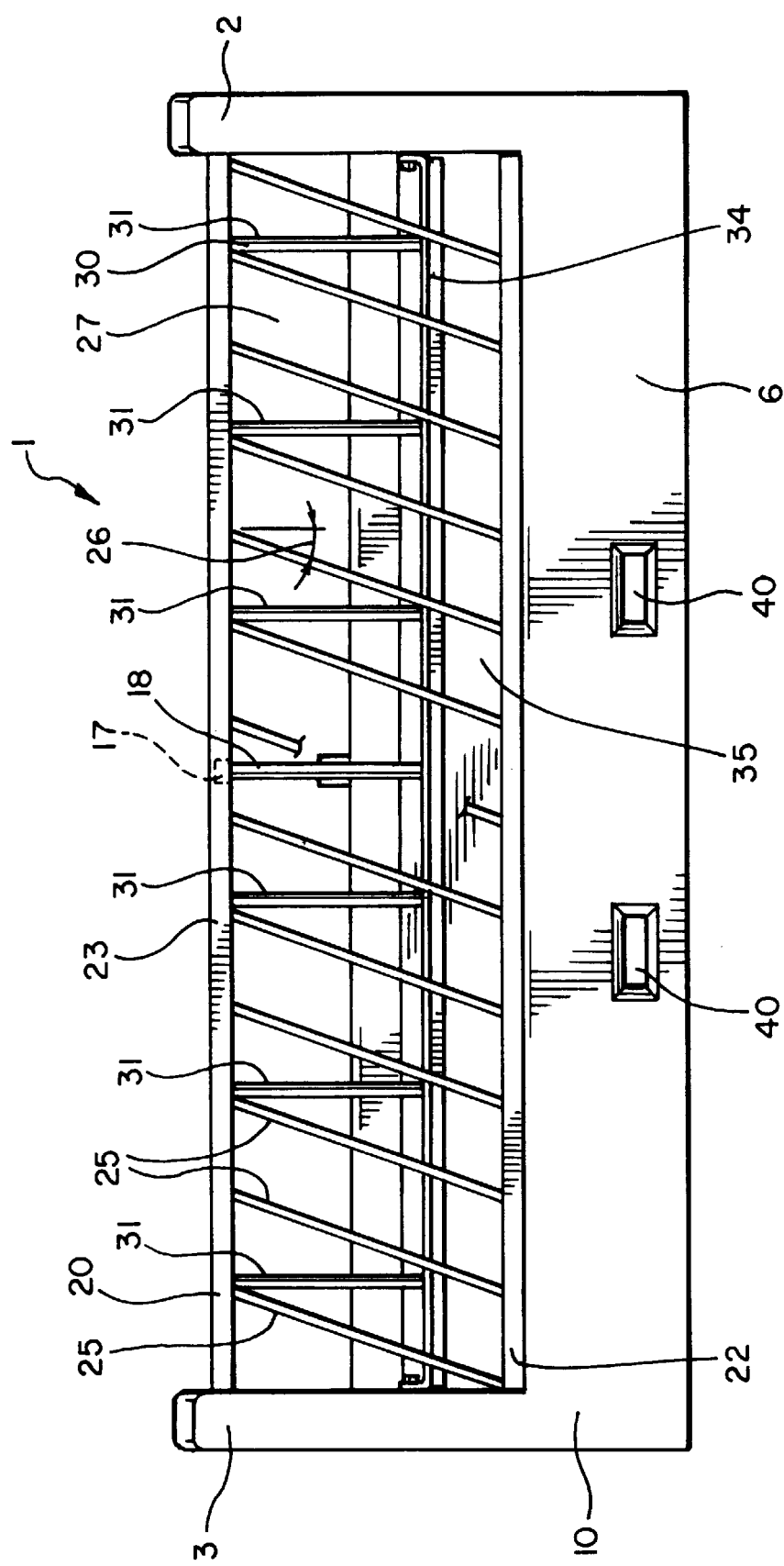
FIG. 1 is a front elevation of the feeder according to the invention.

The livestock feeder according to the present invention may be used for receiving at least one hay bale and dispensing the at least one hay bale to the livestock. The feeder of the present invention may be adapted, by scaling up or down in size, to any type of livestock such as sheep or cattle or the like. The livestock feeder of the present invention as described herein is particularly suited for the distribution of hay bales to cattle, and the dimensions as set forth relate to the use of the feeder for cattle. The dimensions may be adjusted accordingly to adapt the feeder for use with livestock that are larger or smaller than cattle. Dimensions may also be adjusted for different breeds of cattle with differing physical characteristics, i.e., overall height, length of neck, width of head or shoulders, etc.

The feeder 1 of the present invention as shown in FIGS. 1, 2,3, and 4 comprises a trough 10 having a downwardly sloping section 5 of a feeding surface 4 extending from a back wall 8 of the trough 10 to the lowermost portion 12 of the feeding surface 4. The trough also comprises an opposed pair of side walls 2 and 3, and a front wall 6. The front wall has a top surface 7 and the back wall has a top surface 9. In the feeder of the present invention, the front wall top surface 7 has a lower elevation or height than the height or elevation of the back wall top surface 9. The front and back walls 6 and 8, respectively, are located on opposite sides of the feeding surface 4 and between the side walls 2 and 3. The front wall top 7 elevation or height is determined by the size of the livestock to be fed, and may range from about 8 inches to about 20 inches. The back wall top 9 elevation or height is also determined by the size of the livestock being fed and is set so that the back side of the feeder is not available, or inaccessible, to the livestock for feeding. In embodiments of the invention where the feeder 1 is used for cattle, the back wall top elevation may generally be at least about 3 feet. The side walls 2 and 3 together with the front and back walls 6 and 8 define the periphery of the trough 10.

Figure 3:
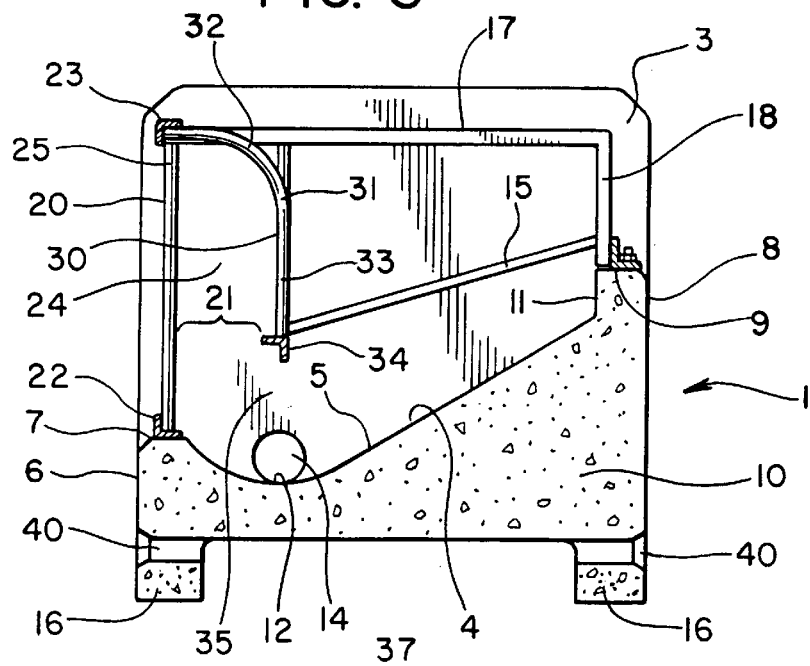
FIG. 3 is a sectional side view of the feeder according to the invention, taken along section line 3—3 of FIG. 2.

As shown in FIG. 3, the feeding surface 4 downwardly sloping section 5 begins at back wall 8 and extends downward and toward the front wall 6 of the feeder until it transitions into lowermost portion 12 of the feeding surface 4. Lowermost portion 12 has an elevation lower than the top surface 7 of the front wall 6. The feeding surface 4 then rises along a curve to the top 7 of front wall 6. The lowermost portion 12 extends substantially parallel to the front and back walls 6 and 8 and between the side walls 2 and 3.

The feeder of the present invention also has an outer cage 20 Comprising a bottom bar 22, a top bar 23, and a plurality of livestock stop bars 25, the bottom bar 22 being affixed by any suitable means such as bolts or anchors to the top surface of the front wall 7. The plurality of livestock stop bars 25 extend from the bottom bar 22 of the outer cage 20 to the top bar 23 and are fastened thereto by any suitable means such as welding or with fasteners. Each livestock stop bar 25 is substantially parallel to and horizontally spaced apart from adjacent livestock stop bars and disposed at a tilt angle 26, relative to a vertical axis, such that adjacent pairs of said livestock stop bars 25 define an angled feeding opening 27 through which individual livestock can project their head but not their shoulders and consume the hay held in the feeder 1. The angled feeding openings 27 require the livestock to turn their head when entering or exiting the feeder, and thus reduce the amount of feed wastage caused by the livestock withdrawing feed from the feeder and dropping it on the ground after they have backed away from the feeder.

The livestock feeder may have a tilt angle 26 of the livestock stop bars, relative to a vertical line, which ranges from about 50° to about 25°. The livestock feeder may have horizontal spacing of the livestock stop bars of from about 8 inches to about 14 inches. The livestock feeder has a livestock feeding region 21 defined by a horizontal distance between the bottom hay bale stop bar 34 and the livestock stop bars 25, which distance may range from about 8 inches to about 16 inches.

The feeder of the present invention also has an inner frame 30 comprising a plurality of curved hay bale stop bars 31 attached by any suitable means such as welding or fasteners to the outer cage top bar 23. As shown in FIG. 3, each curved hay bale stop bar 31 has an arcuate section 32 extending both backward toward the back wall 8 of the trough 10 and downward toward the bottom surface 37 of the trough 10. The arcuate section 32 connects to a substantially straight section 33 extending substantially vertically and attached to a horizontally disposed bottom hay bale stop bar 34 which extends between the opposed side walls of the trough 2 and 3. The bottom hay bale stop bar 34 is positioned above and not in contact with the feeding surface 4 of the trough.

The outer cage 20 and inner frame 30 define a livestock feeding region 24 between them, as shown in FIG. 3. Livestock feeding region 24 functions in a way that when the livestock are feeding, loosened and dropped seed and hay flow down the downwardly sloping feeding surface 5, towards the front wall 6 of the trough 10 and into the lowermost portion 12 where they are retained until they are consumed by the livestock without wastage. The feeder 1 of the present invention has the advantage wherein the access for feeding by the livestock is limited to the front wall 6 side of the feeder 1. The limited feed access provides the benefits of easy, safe accessibility by vehicles used for: 1) loading the feeder from behind back wall 8 or, 2) transporting or relocating the feeder. The livestock do not gather around or trample the ground around the back or sides of the feeder because they cannot access the feed. Thus trampling which would lead to unstable ground due to the formation of mud and loose soil is substantially avoided.

Figure 2:
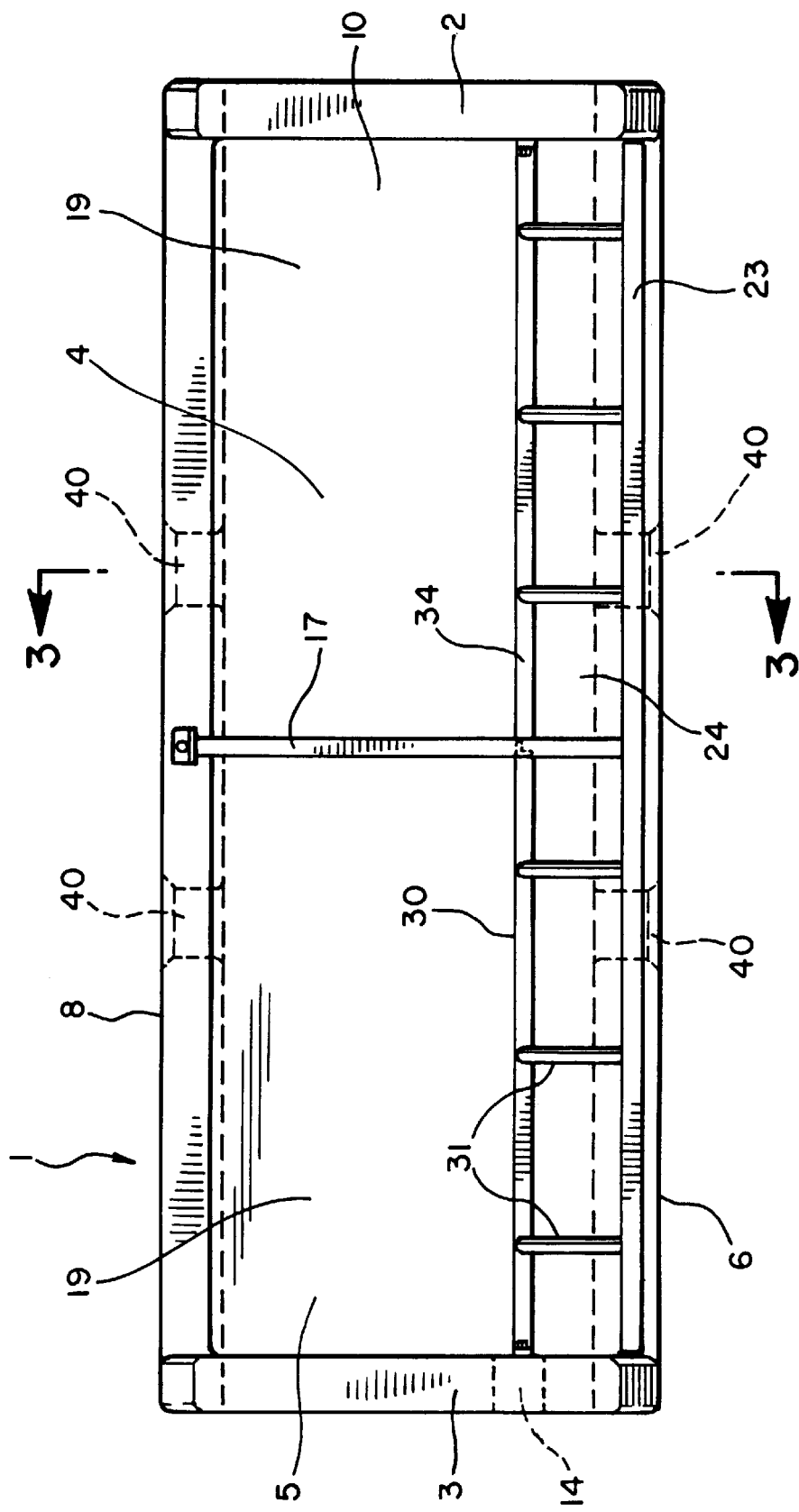
FIG. 2 is a top plan view of the feeder according to the invention.

In embodiments of the invention, the bottom hay bale stop bar 34 may be positioned directly above and not in contact with the lowermost portion 12 of the feeding surface 4 of the trough 10. The livestock feeder may have a configuration wherein the lowermost portion 12 has a lower end at one side wall, in comparison to the height of the lowermost portion at the other side wall, and the trough further comprises a drain opening 14 at the lower end, for example at side wall 3 as shown in FIGS. 2 and 3. In embodiments of the invention, the livestock feeder has the trough 10, especially the lowermost portion 12, positioned such that the hay which drops from the animals' mouth falls directly onto the lowermost portion 12 of the feeding surface 4 or drops onto the downwardly sloping feeding surface 5 and moves or slides downward to the lowermost portion 12. In this manner, essentially all of the hay dropping from an animal's mouth is retained in the lowermost portion 12 of the feeding surface 4 and can be consumed by the animals, thereby eliminating wastage.

The design of the livestock feeder of the invention has the advantage of both controlling the feeding of livestock through the use of the feeder comprising an outer cage 20 and an inner frame 30, yet also affords the livestock the opportunity to have direct access to that portion of the hay bale directly beneath the bottom hay bale stop bar 34 and above the feeding surface 4 in a direct access feeding region 35, as shown in FIGS. 1 and 3.

The livestock feeder may comprise a material selected from the group consisting of concrete and cement, including precast concrete and reinforced concrete. An advantage of using concrete or cement to form the trough is the feeder is sufficiently strong and heavy so it is not moved around or damaged by the livestock as are portable or wheeled sheet metal or wood feeders. Also, bolts or threaded rods may be embedded in or cast in the concrete or cement for fastening or bolting of the inner and/or outer frames or cages to the trough.

All stop bars and other framework for the inner frame and the outer cage may be made of any suitable material. Steel is preferred for its strength and ease of fabrication at low cost. L-shaped "angle iron" and/or tubular steel may be used, tubular steel being preferred for those sections the animals contact, such as stop bars 25 and 31. Angle iron is preferred for those sections requiring attachment by welding or fastening such as bottom bar 22 and top bar 23, as well as bottom hay bale stop bar 34.

The livestock feeder may be movable, and may also have a trough further comprising a base having receiving means for accepting lifting forks of a fork lift, such as slots 40 in the front wall 6 and/or back wall 8. The livestock feeder of the present invention may have a trough further comprising a footed base with feet 16 to provide resistance to movement by sliding once the feeder has been placed. The feeder may also be permanently installed, and have an existing structure used, for example existing walls, as side walls 2 and/or 3.

To assist the removal of a cylindrical hay bale from a loading/unloading device such as a bale spear or fork lift, the livestock feeder may have a back wall 8 further comprising a vertical lip portion 11 below the top surface 9. The lip portion 11 prevents backward movement of the bale as the bale spear is drawn backwards thereby facilitating removal of the hay bale from the bale spear. The livestock feeder is adapted to receive a large cylindrical hay bale having a diameter of up to 8 feet and a longitudinal axis ranging from about 4 feet to about 8 feet in length. Such cylindrical hay bales may be in the range of about 500 lbs to about 2000 lbs.

To accomodate such high mechanical loads, the livestock feeder may further comprise one or more lower braces 15 connecting the inner frame 30 of the feeder to the back wall 8 of the trough, in particular at the top surface 9. Also, the livestock feeder may further comprise one or more horizontal upper braces 17 extending back towards the back wall 8 and down via vertical section 18, thus connecting the outer cage 20 of the feeder to the back wall of the trough at the top surface 9. Horizontal bracing means 17, together with vertical section 18 may also serve as dividers to partition the feeder into two or more hay bale receiving sections 19, as shown in FIG. 2.

Figure 4:
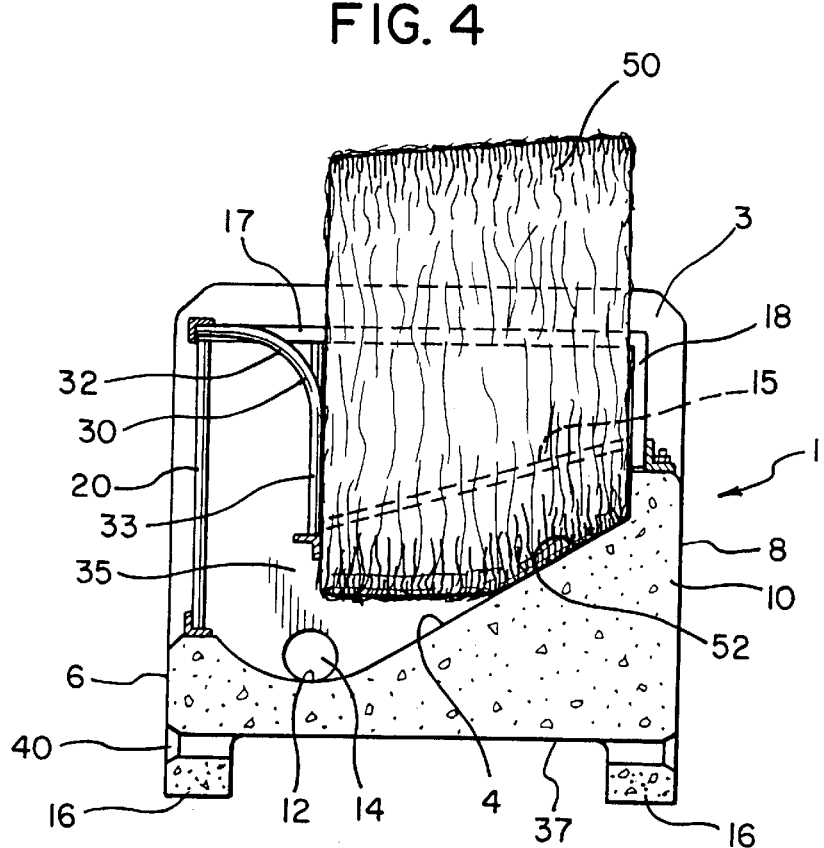
FIG. 4 is a sectional side view of the feeder according to the invention showing a hay bale contained therein.

As shown in FIG. 4, substantially all of the cylindrical hay bale 50 may be suspended above the downwardly sloping feeding surface 4. Support for the suspension of hay bale 50 may be provided by only the inner frame 30 and a top or upper portion 52 of the downwardly sloping surface 4. As shown in FIG. 4, the bale 50 may be unsupported between the inner frame 30 and the upper portion 52 of surface 4.

The loading of the hay bale 50 is accomplished via suitable loading means such as a fork truck with a bale spear which approaches the feeder 1 from the back wall 8 and loads a hay bale 50 by lowering it into a hay bale receiving section 19 and backing up, thus withdrawing the hay bale from the spear. The hay bale 50 drops into the section 19 and may be consumed immediately by the livestock, and such livestock may be present when the feeder 1 is loaded, another advantage of the feeder 1 according to the present invention.

In other embodiments of the invention, the livestock feeder of the invention may comprise at least two feeders 1 as described and shown in FIGS. 1 to 3, having a side-to-side configuration where a side wall 2 of a first feeder abuts the side wall 3 of a second feeder. In other embodiments, a back-to-back configuration may be employed wherein back wall 8 of a first feeder 1 abuts the back wall 8 of a second feeder 1. Either individual feeders, side-to-side feeders, or a back-to-back feeders may be loaded from the direction of the front wall 6.

Another advantage of the feeder according to the present invention relates to the ease with which the hay bale restraining means, such as wire or twine, may be removed from the bale after it is placed in the feeder. Because the hay bale is not entirely surrounded by an inner cage, the restraining means may be removed after the hay bale is placed in the feeder with a minimum of effort, preventing the opportunity for the animals to ingest the twine, which can cause intestinal blockage and be fatal.

What is claimed is:

1. A livestock feeder for receiving at least one hay bale and dispensing said at least one hay bale to said livestock, said feeder comprising:

a trough having a feeding surface having a downwardly sloping section, an opposed pair of side walls, a front wall having a top surface, a back wall having a top surface, said front wall top surface having a lower elevation than said back wall top surface, said front and back walls located on opposite sides of said feeding surface and between said opposed side walls, said side walls together with said front and back walls defining a periphery of said trough, said feeding surface having a lowermost portion adjacent said downwardly sloping section and having an elevation lower than the top surface of the front wall, said lowermost portion extending substantially parallel to the front and back walls and between the side walls, an outer cage comprising a bottom bar, a top bar, and a plurality of livestock stop bars, said bottom bar being affixed to the top surface of the front wall, said plurality of livestock stop bars extending from the bottom bar of the outer cage to the top bar, each livestock stop bar being substantially parallel to and horizontally spaced apart from adjacent livestock stop bars and being disposed at a tilt angle, relative to a vertical axis, such that adjacent pairs of said livestock stop bars define an angled feeding opening through which individual livestock can project their head but not their shoulders and consume said hay held in said feeder and which require the livestock to turn their head when entering or exiting said feeder, and an inner frame comprising a plurality of curved hay bale stop bars attached to the outer cage top bar, each curved hay bale stop bar having an arcuate section extending both toward the back wall of the trough and toward the bottom surface of the trough and connecting to a section extending substantially vertically and attached to a horizontally disposed bottom hay bale stop bar extending between the opposed side walls of the trough, wherein said bottom hay bale stop bar is positioned above and not in contact with the feeding surface of the trough, said outer cage and said inner frame defining a livestock feeding region between them so that loosened seed and hay flow down the sloping feeding surface and towards the front wall of the trough for access by the livestock without wastage, and wherein the access for feeding is limited to the front wall side of the feeder.

2. A livestock feeder as claimed in claim 1 wherein said bottom hay bale stop bar is positioned above and not in contact with said lowermost portion of the feeding surface of the trough.

3. A livestock feeder as claimed in claim 1 wherein said trough comprises a material selected from the group consisting of concrete and cement.

4. A livestock feeder as claimed in claim 1 wherein said feeder is movable.

5. A livestock feeder as claimed in claim 4 wherein said trough further comprises a base having receiving means for accepting lifting forks of a fork lift.

6. A livestock feeder as claimed in claim 4 wherein said trough further comprises a footed base to provide resistance to movement by sliding once the feeder has been placed.

7. A livestock feeder as claimed in claim 1 wherein said back wall further comprises a substantially vertical lip portion below the top surface to facilitate removing the hay bale from a bale spear.

8. A livestock feeder as claimed in claim 1 adapted to receive a large cylindrical hay bale having a diameter of up to 8 feet and a longitudinal axis ranging from about 4 feet to about 8 feet in length.

9. A livestock feeder as claimed in claim 8 wherein substantially all of said cylindrical hay bale is suspended above said downwardly sloping feeding surface, support for said bale being provided only by said inner frame and an upper portion of said downwardly sloping feeding surface, said bale being unsupported between said inner frame and said upper portion.

10. A livestock feeder as claimed in claim 1 wherein said lowermost portion has a lower end at one side wall, in comparison to the height of the lowermost portion at the other side wall, and wherein said trough further comprises a drain opening at said lower end to facilitate drainage from said trough.

11. A livestock feeder as claimed in claim 1 further comprising a brace connecting said inner frame to the back wall of the trough.

12. A livestock feeder as claimed in claim 1 further comprising a brace connecting the outer cage of the feeder to the back wall of the trough.

13. A livestock feeder comprising at least two feeders as claimed in claim 1 in a back to back configuration.

14. A livestock feeder as claimed in claim 1 wherein said feeder may be loaded with hay while the livestock are feeding.

15. A livestock feeder as claimed in claim 1 wherein the trough is positioned such that the hay which drops from an animal's mouth falls directly onto the lowermost portion of the feeding surface or drops onto the downwardly sloping feeding surface and moves to the lowermost portion, whereby essentially all of the hay dropping from the animal's mouth is retained in the lowermost portion of the feeding surface and can be consumed by the animals, thereby eliminating wastage.

16. A livestock feeder as claimed in claim 1 wherein the tilt angle of the livestock stop bars, relative to a vertical line, ranges from about 50° to about 25°.

17. A livestock feeder as claimed in claim 8 wherein the cylindrical hay bale has a fastening means surrounding the circumference, such fastening means being removable when the bale has been placed in the feeder.

18. A livestock feeder as claimed in claim 1 wherein the horizontal spacing of the livestock stop bars is from about 8 inches to about 14 inches.

19. A livestock feeder as claimed in claim 1 wherein the livestock feeding region is defined by a horizontal distance between the bottom hay bale stop bar and the livestock stop bars, said distance ranging from about 8 inches to about 16 inches.

20. A livestock feeder as claimed in claim 19 wherein the hay bale is directly accessible to said livestock in a direct access feeding region below the bottom hay bale stop bar and above the feeding surface.

* * * * *